United States Patent
Lim et al.

(10) Patent No.: US 8,330,928 B2
(45) Date of Patent: Dec. 11, 2012

(54) PAD OF LIQUID CRYSTAL DISPLAY DEVICE AND METHOD FOR MANUFACTURING THE SAME

(75) Inventors: Kyoung Moon Lim, Gyeonggi-do (KR); Yong Chan Park, Seoul (KR); So Haeng Cho, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 399 days.

(21) Appl. No.: 12/213,294

(22) Filed: Jun. 17, 2008

(65) Prior Publication Data
US 2009/0002624 A1 Jan. 1, 2009

(30) Foreign Application Priority Data
Jun. 27, 2007 (KR) .................. 10-2007-0063824

(51) Int. Cl.
*G02F 1/1345* (2006.01)
(52) U.S. Cl. .................................. 349/152
(58) Field of Classification Search ............ 349/152
See application file for complete search history.

(56) References Cited

U.S. PATENT DOCUMENTS

| | | | | |
|---|---|---|---|---|
| 6,198,522 | B1 * | 3/2001 | Yanagi | 349/152 |
| 6,466,294 | B1 * | 10/2002 | Yamagishi et al. | 349/155 |
| 6,985,193 | B2 * | 1/2006 | Jang | 349/43 |
| 2004/0239845 | A1 * | 12/2004 | Choi | 349/113 |
| 2005/0179851 | A1 * | 8/2005 | Hayashi et al. | 349/152 |
| 2005/0194657 | A1 * | 9/2005 | Koide | 257/499 |
| 2006/0238689 | A1 * | 10/2006 | Kim et al. | 349/143 |

* cited by examiner

*Primary Examiner* — Jerry Blevins
(74) *Attorney, Agent, or Firm* — Morgan, Lewis & Bockius LLP

(57) ABSTRACT

A pad of a liquid crystal display and a method for manufacturing the same are disclosed. The pad of the liquid crystal display includes an IC substrate and a lower substrate opposite each other, an IC pad metal formed on the IC substrate, a bump formed on the IC substrate to come into contact with the IC pad metal, a first transparent electrode electrically connected with the IC pad metal, an interlayer insulating layer formed between the IC pad metal and the first transparent electrode, a gate pad metal formed on the lower substrate, a second transparent electrode electrically connected with the gate pad metal, a gate insulating layer formed between the gate pad metal and the second transparent electrode, and a conductive ball to electrically connect the first transparent electrode and the second transparent electrode to each other.

11 Claims, 9 Drawing Sheets

PAD OF LIQUID CRYSTAL DISPLAY DEVICE AND METHOD FOR MANUFACTURING THE SAME

This application claims the benefit of the Korean Patent Application No. P 2007-0063824, filed on Jun. 27, 2007, which is hereby incorporated by reference as if fully set forth herein.

BACKGROUND OF THE INVENTION

1. Field of the Invention

The present invention relates to a pad of a liquid crystal display and a method for manufacturing the same, and more particularly, to a pad of a liquid crystal display, which can show enhanced adhesiveness when a drive IC, which is manufactured via a low-temperature poly-silicon Driver Integrated Circuit (DIC) technology, is attached to a liquid crystal panel, and a method for manufacturing the pad.

2. Discussion of the Related Art

With the development of information society, a multiplicity of demands for displays is gradually increasing. To meet these demands, recently, various kinds of flat panel displays, such as liquid crystal displays, plasma display panels, electro luminescent displays, vacuum fluorescent displays, etc., have been studied, and some of these displays have already been utilized to various equipments.

Of them, currently, a liquid crystal display, which substitutes for a Cathode Ray Tube (CRT), is the most frequently used mobile image display, by virtue of advantages of superior image quality, low-weight, thinness, and low consumption of electric power. In addition to being used as a mobile display such as a monitor of a laptop computer, the liquid crystal display has been developed for various purposes, such as televisions for displaying broadcast signals transmitted thereto, desktop monitors, etc.

To utilize the above-described liquid crystal display as a screen display for use in various fields, a possibility of realizing high-quality images, having characteristics of high-definition, high-brightness, and large display area, etc., while maintaining the advantages of low-weight, thinness, and low consumption of electric power is key to development.

In the above-described liquid crystal display, a drive circuit includes a gate driver to drive gate lines in a liquid crystal panel, a data driver to drive data lines, a timing controller to control drive timings of the gate driver and the data driver, and a power source to supply power signals required to drive the liquid crystal panel and the drive circuit.

The data driver and the gate driver are divided into a plurality of integrated circuits (hereinafter, referred to as "ICs") and are manufactured to take the form of chips. Each of the driver ICs may be mounted in an open IC region on a Tape Carrier Package (TCP), or may be mounted on a base film of the TCP in a Chip-On-Film (COF) manner. The driver IC is also electrically connected with the liquid crystal panel in a Tape Automated Bonding (TAB) manner. Alternatively, the driver IC can be directly mounted on the liquid crystal panel in a Chip-On-Glass (COG) manner. The timing controller and the power source take the form of chips, and are mounted on a main Printed Circuit Board (PCB).

Recently, there has been developed a low-temperature poly-silicon driver integrated circuit technology, in which a driver IC is formed on a glass substrate via a low-temperature poly-silicon method, and the resulting glass substrate is attached to a liquid crystal panel.

However, attaching the substrate, on which the driver IC is mounted, to the liquid crystal panel causes problems of poor pad uniformity and weak adhesiveness between a pad of the driver IC and the liquid crystal panel.

SUMMARY OF THE INVENTION

Accordingly, the present invention is directed to a pad of a liquid crystal display and a method for manufacturing the same that substantially obviate one or more problems due to limitations and disadvantages of the related art.

An object of the present invention is to provide a pad of a liquid crystal display, which can achieve enhanced uniformity by means of bumps formed thereon when a driver IC, which is manufactured via a low-temperature poly-silicon Driver Integrated Circuit technology, is attached to a liquid crystal panel, and a method for manufacturing the pad.

Another object of the present invention is to provide a pad of a liquid crystal display, in which a thickness of a bump can be optionally adjusted, thereby controlling pressure conditions, etc., upon bonding of an IC substrate and a liquid crystal panel, and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a pad of a liquid crystal display comprises: an IC substrate and a lower substrate opposite each other; an IC pad metal formed on the IC substrate; a bump formed on the IC substrate to come into contact with the IC pad metal; a first transparent electrode electrically connected with the IC pad metal; an interlayer insulating layer formed between the IC pad metal and the first transparent electrode; a gate pad metal formed on the lower substrate; a second transparent electrode electrically connected with the gate pad metal; a gate insulating layer formed between the gate pad metal and the second transparent electrode; and a conductive ball to electrically connect the first transparent electrode and the second transparent electrode to each other.

In accordance with another aspect of the present invention, there is provided a method for manufacturing a pad of a liquid crystal display comprising: forming an IC pad metal on an IC substrate; forming a bump on the IC substrate to come into contact with the IC pad metal; forming a first transparent electrode electrically connected with the IC pad metal; forming a gate pad metal on a lower substrate; forming a second transparent electrode on the gate pad metal so as to be electrically connected with the gate pad metal; and locating a conductive ball between the IC substrate and the lower substrate, and bonding the IC substrate and the lower substrate to each other so as to electrically connect the first transparent electrode and the second transparent electrode to each other via the conductive ball.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, a pad of a liquid crystal display according to a first embodiment of the present invention will be described with reference to the accompanying drawings.

Figure 1:
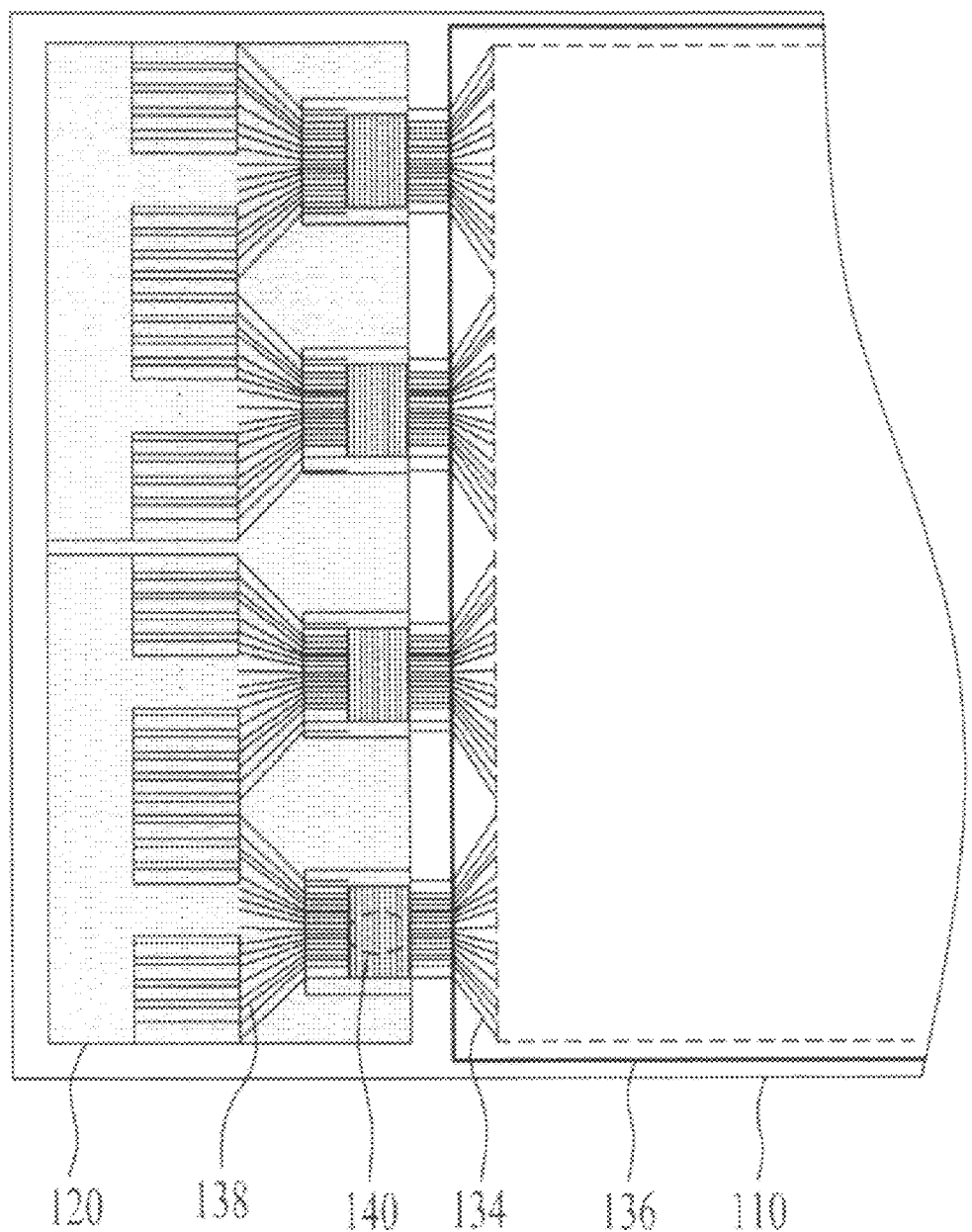
FIG. 1 is a plan view illustrating a liquid crystal display according to a first embodiment of the present invention.
Figure 2:
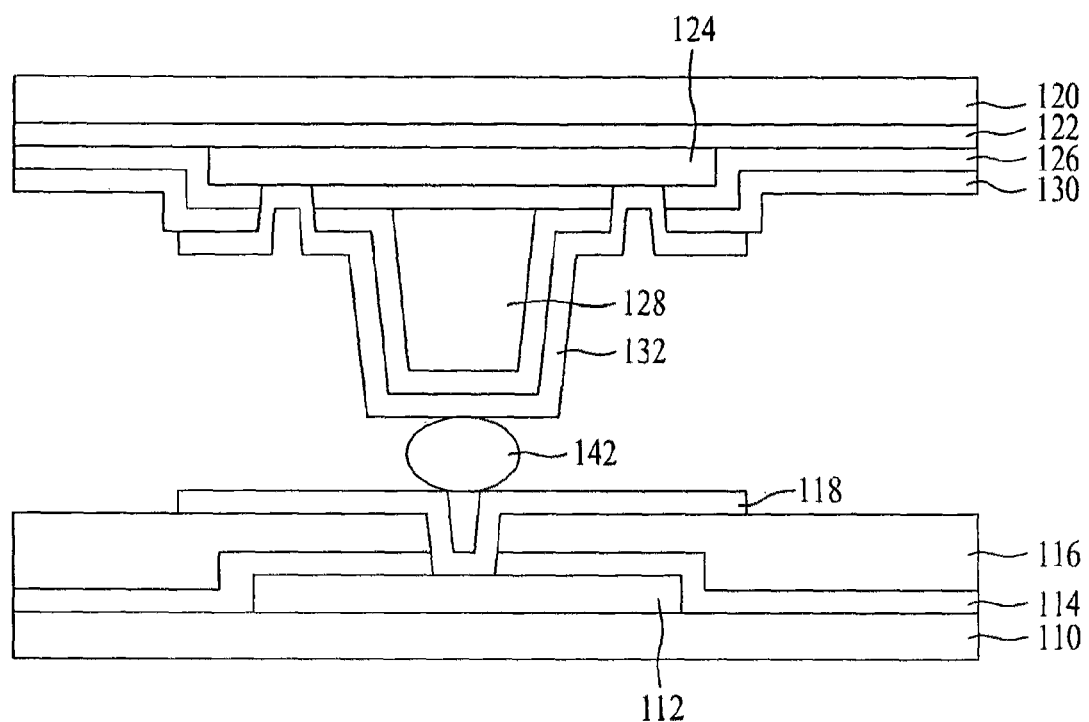
FIG. 2 is a sectional view illustrating a pad of the liquid crystal display according to the first embodiment of the present invention.

FIG. 1 is a plan view illustrating a liquid crystal display according to a first embodiment of the present invention, and FIG. 2 is a sectional view illustrating a pad of the liquid crystal display according to the first embodiment of the present invention.

The liquid crystal display according to the first embodiment of the present invention includes a lower substrate 110, an upper substrate 136 formed opposite the lower substrate 110, an IC substrate formed, opposite to the lower substrate 120, on a corner of the lower substrate 120 so as not to overlap the upper substrate 136, a gate line 134 to transmit a gate signal to a device formed on the lower substrate 110, a link line 138 to transmit the gate signal from a driver IC formed on the IC substrate 120, and a pad 140 to connect the gate line 134 and the link line 138 to each other.

Although not shown in detail, the lower substrate 110 includes a plurality of gate lines arranged in a given direction with a predetermined interval and a plurality of data lines arranged in a given direction orthogonal to the gate lines with a predetermined interval, to define pixel regions. Each of the pixel regions defined by the gate lines and the data lines is formed with a pixel electrode, and thin-film transistors are formed at intersections of the gate lines and the data lines. The thin-film transistors are turned on/off according to a scan signal of the gate lines, to apply a data signal of the data lines to the respective pixel electrodes. This substrate is called a thin-film transistor array substrate.

The upper substrate 136 includes a black matrix layer to intercept transmission of light to a region except for the pixel regions, R, G, and B color filter layers to represent different colors, and a common electrode to realize an image. This substrate is called a color filter array substrate.

The IC substrate 120 includes a circuit, in which thin-film transistors made of poly-silicon are formed on a glass substrate. In this case, a method for preparing the poly-silicon can be classified, according to a process temperature, into a low-temperature process and a high-temperature process. Of these processes, the high-temperature process has a process temperature of about 1,000° C., and requires temperatures exceeding a deformation temperature of an insulating substrate. Therefore, the high-temperature process has the following disadvantages; a high price quartz substrate must be used because of low heat-resistance of a glass substrate; and a poly-silicon thin film obtained by the high-temperature process has poorer device melting properties than those obtained by the low-temperature process because it causes, upon layer formation, a high surface roughness and low-grade crystallinity due to fine crystal grains, etc. For this reason, a technology, in which poly-silicon is prepared by crystallizing amorphous silicon that can be deposited at a low-temperature, has been studied and developed.

The high-temperature process includes Solid Phase Crystallization (SPC), and the low-temperature process includes laser annealing, and Metal Induced Crystallization (MIC).

SPC is a method for preparing poly-silicon by thermally treating amorphous silicon at a high-temperature for a long time. Laser annealing is a method for growing poly-silicon on a substrate, on which an amorphous silicon thin film is deposited, by irradiating a laser on the substrate. Also, MIC is a method for preparing poly-silicon by depositing metal on amorphous silicon.

Next, the pad 140, through which the gate line 134 and the link line 138 are connected to each other, will be described.

The pad 140 of the liquid crystal display according to the first embodiment of the present invention, as shown in FIG. 2, includes the IC substrate 120 and the lower substrate 110 opposite each other, a first insulating layer 122 formed throughout an upper surface of the IC substrate 120, an IC pad metal 124 formed on the first insulating layer 122, a second insulating layer 126 formed throughout an upper surface of the first insulating layer 122 including the IC pad metal 124, a bump 128 formed on the second insulating layer 126 above the IC pad metal 124, a third insulating layer 130 formed throughout an upper surface of the second insulating layer 126 including the bump 128, a first transparent electrode 132 formed to be electrically connected with the IC pad metal 124 by penetrating through the second insulating layer 125 and the third insulating layer 130, a gate pad metal 112 formed on the lower substrate 110, a gate insulating layer 114 formed throughout an upper surface of the lower substrate 110 above the gate pad metal 112, a protective layer 116 formed throughout an upper surface of the gate insulating layer 114, a second transparent electrode 118 formed to be electrically connected with the gate pad metal 112 by penetrating through the gate insulating layer 114 and the protective layer 116, and a conductive ball 142 to electrically connect the first transparent electrode 132 and the second transparent electrode 118 to each other.

The IC substrate 120 and the lower substrate 110 are made of glass.

The IC pad metal 124 and the gate pad metal 112 are made of low-resistance metals and alloys such as copper (Cu), molybdenum (Mo), chrome (Cr), aluminum (Al), aluminum-neodymium (AlNd), aluminum-molybdenum (AlMo), etc.

The bump 128 is made of positive or negative photo-sensitive photo-acryl, and has a height of about 3 μm or more. Preferably, the height of the bump 128 is about 5 μm or more.

In the above-described pad 140 of the liquid crystal display according to the first embodiment of the present invention, the bump 128, formed on the IC substrate 120, can take the form of a photo-acryl protrusion, which is easy to adjust a thickness thereof. Such a thickness-adjustable photo-acryl bump 128 can achieve good thickness uniformity, and, consequently, achieve effective electric connection between the lower substrate 110 and the IC substrate 120.

The first transparent electrode 132 and the second transparent electrode 118 are made of transparent electrodes such as Indium Tin Oxide (ITO), Indium Zinc Oxide (IZO), etc.

The conductive ball 142 is formed by plating nickel (Ni) on the exterior of a spherical plastic-based material, and again plating gold (Au) on the exterior of the resulting nickel sphere. Although not shown, the conductive ball 142 is included in thermosetting resin, and is interposed between the IC substrate 120 and the lower substrate 110.

Hereinafter, a method for manufacturing the pad of the liquid crystal display according to the first embodiment of the present invention will be described with reference to the accompanying drawings.

FIGS. 3A to 3F are sectional views illustrating sequential processes of a method for manufacturing the pad of the liquid crystal display according to the first embodiment of the present invention.

Figure 3A:
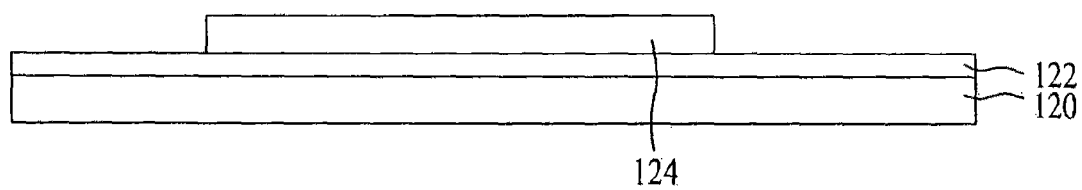
FIGS. 3A to 3F are sectional views illustrating sequential processes of a method for manufacturing the pad of the liquid crystal display according to the first embodiment of the present invention.

As shown in FIG. 3A, any one of inorganic insulating materials, such as silicon nitride ($SiN_x$), silicon oxide ($SiO_2$), etc., is deposited throughout the upper surface of the IC substrate 120, to form the first insulating layer 122.

Subsequently, after depositing any one of low-resistance materials, such as copper (Cu), molybdenum (Mo), chrome (Cr), aluminum (Al), aluminum-neodymium (AlNd), aluminum-molybdenum (AlMo), etc, throughout the upper surface of the first insulating layer 122, the deposited low-resistance material is patterned via photography and etching processes, to form the IC pad metal 124.

In this case, although not shown, a gate driver IC (not shown) formed on the IC substrate 120 is formed with a thin-film transistor using a poly-silicon semiconductor layer. Therefore, to prevent the IC substrate 120 from being damaged via buffer crystallization, a buffer oxide layer is formed throughout the surface of the IC substrate 120.

The IC pad metal 124 is electrically connected with the gate driver IC (not shown) formed on the IC substrate 120.

Figure 3B:
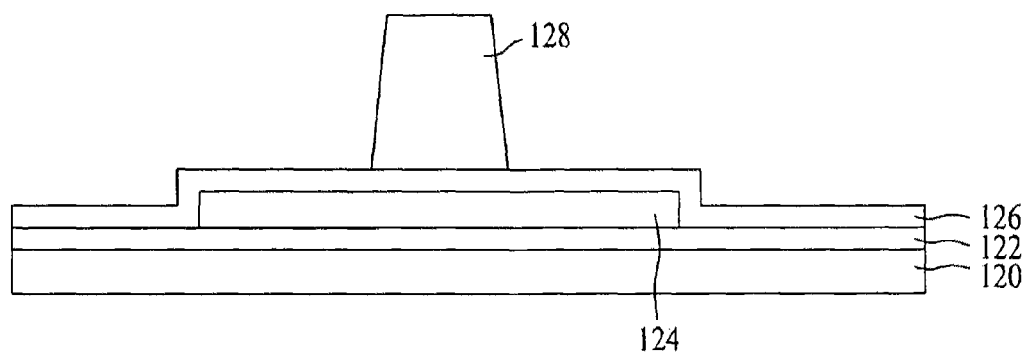

As shown in FIG. 3B, the second insulating layer 126 is formed by depositing any one of inorganic insulating materials, such as silicon nitride ($SiN_x$), silicon oxide ($SiO_2$), etc., throughout the upper surface of the first insulating layer 122 including the IC pad metal 124.

Subsequently, after a photo-acryl layer is formed on the second insulating layer 126 above the IC pad metal 124 to have a height of 3 μm or more, the formed photo-acryl layer is patterned via exposure and developing processes, to form the bump 128 above the IC pad metal 124.

Figure 3C:
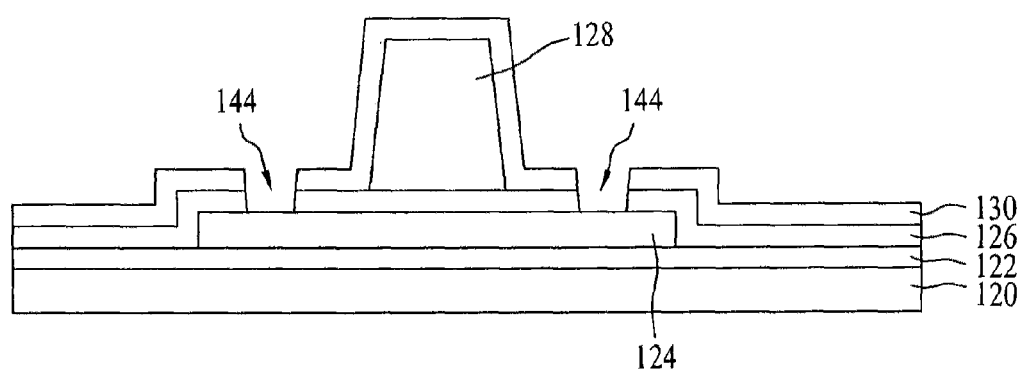

As shown in FIG. 3C, the third insulating layer 130 is formed by depositing any one of inorganic insulating materials, such as silicon nitride ($SiN_x$), silicon oxide ($SiO_2$), etc., throughout the upper surface of the second insulating layer 126 including the bump 128.

Subsequently, the second insulating layer 126 and the third insulating layer 130 are patterned via photography and etching processes, to form contact holes 144 through the layers 126 and 130, such that partial upper regions of the IC pad metal 124 at opposite sides of the bump 128 are exposed to the outside.

Figure 3D:
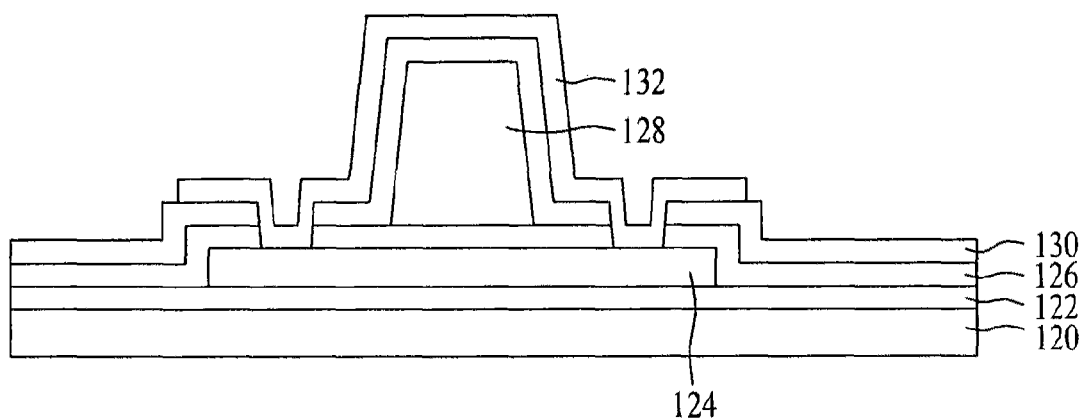

As shown in FIG. 3D, after depositing any one of transparent electrode materials, such as Indium Tin Oxide (ITO) Indium Zinc Oxide (IZO), etc., throughout the upper surface of the third insulating layer 130 including the contact holes 144, the deposited transparent electrode material is patterned, together with the second and third insulating layers 126 and 130, via photography and etching processes. Thereby, the first transparent electrode 132 is formed in such a way that it is electrically connected with the IC pad metal 124 by penetrating through the second insulating layer 126 and third insulating layer 130.

In the above-described processes, the formation of the third insulating layer 130 may be omitted. Specifically, in an alternative embodiment, after forming the bump 128, the second insulating layer 126 may be patterned to form the contact holes 144, and then, the first transparent electrode 132 may be formed thereon.

Figure 3E:
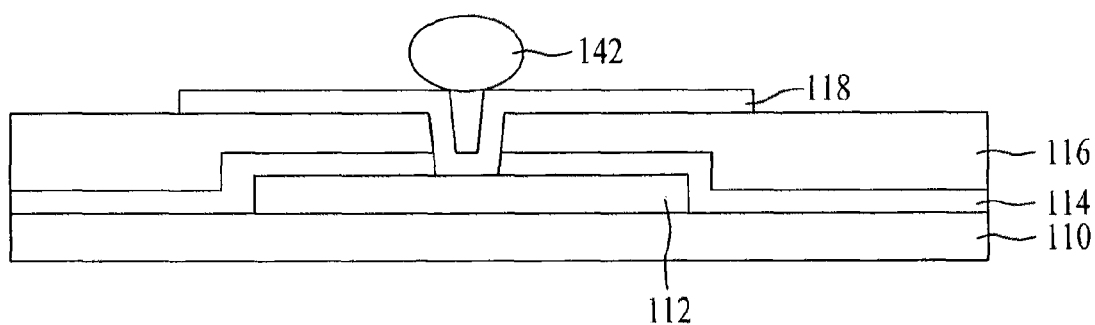

As shown in FIG. 3E, the gate pad metal 112 is formed on the lower substrate 110 by use of any one of copper (Cu), molybdenum (Mo), chrome (Cr), aluminum (Al), aluminum-neodymium (AlNd), and aluminum-molybdenum (AlMo). The gate insulating layer 114 and the protective layer 116 are sequentially formed throughout the surface of the lower substrate 110 including the gate pad metal 112.

Subsequently, the gate insulating layer 114 and the protective layer 116 are patterned, to expose a predetermined upper region of the gate pad metal 112. Then, the second transparent electrode 118 is formed in such a way that it is electrically connected with the gate pad metal 112 by penetrating through the gate insulating layer 114 and the protective layer 116.

Then, thermosetting resin including the conductive ball 142 therein is formed on the lower substrate 110. In this case, the conductive ball 142 is formed by plating nickel (Ni) on the exterior of a spherical plastic material and again plating gold (Au) thereon.

Figure 3F:
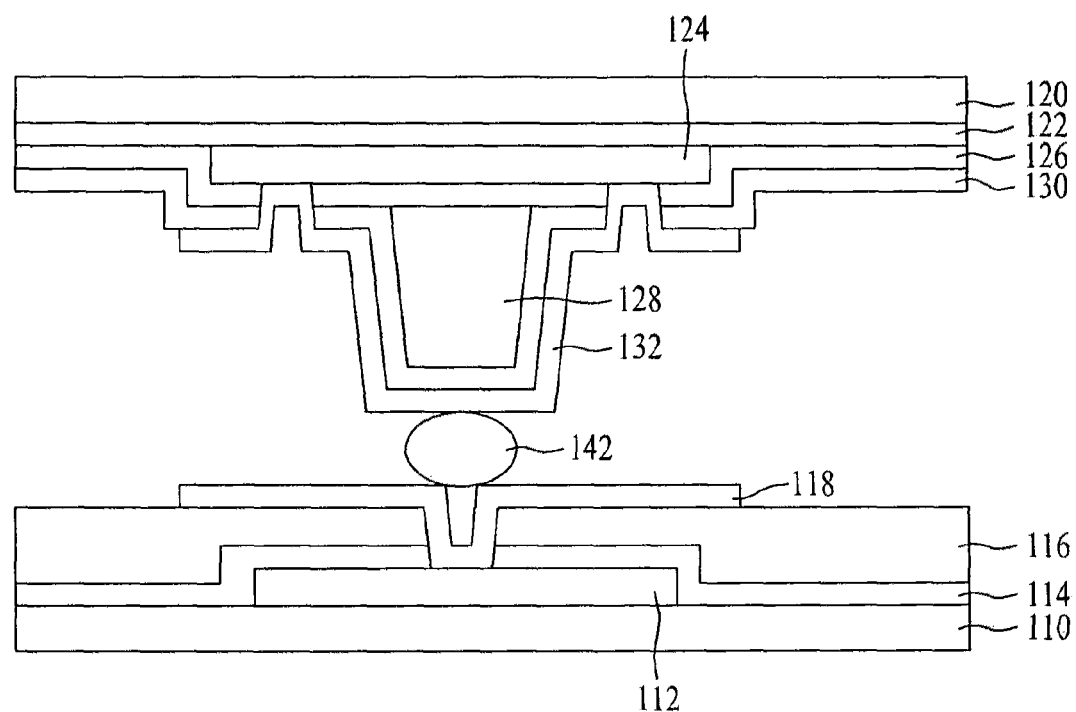

As shown in FIG. 3F, the IC substrate 120 is arranged opposite the lower substrate 110. As both the substrates 120 and 110 are bonded to each other upon receiving external heat, the conductive ball 142 is pressed by both the substrates 120 and 110. As a result, the conductive ball 142 can serve to electrically connect the first transparent electrode 132 and the second transparent electrode 118 to each other between the lower substrate 110 and the IC substrate 120.

Of course, the formation of the first insulating layer 122, the second insulating layer 126 and the third insulating layer 130 on the IC substrate 120 and the formation of the gate insulating layer 114 and the protective layer 116 on the lower substrate 110 may be carried out differently from the above description of the first embodiment, according to process design.

As one example, the first insulating layer 122 may be omitted, any one of the second insulating layer 126 and the third insulating layer 130 may be omitted, or additional insulating layers can be formed. That is, a single insulating layer or a plurality of insulating layers can be formed between the IC pad metal 124 and the first transparent electrode 132.

As another example, the gate insulating layer 114 or the protective layer 116 may be omitted. That is, a single insulating layer or a plurality of insulating layers can be between the gate pad metal 112 and the second transparent electrode 118.

Now, a pad of the liquid crystal display according to a second embodiment of the present invention will be described in more detail with reference to the accompanying drawings.

Figure 4:
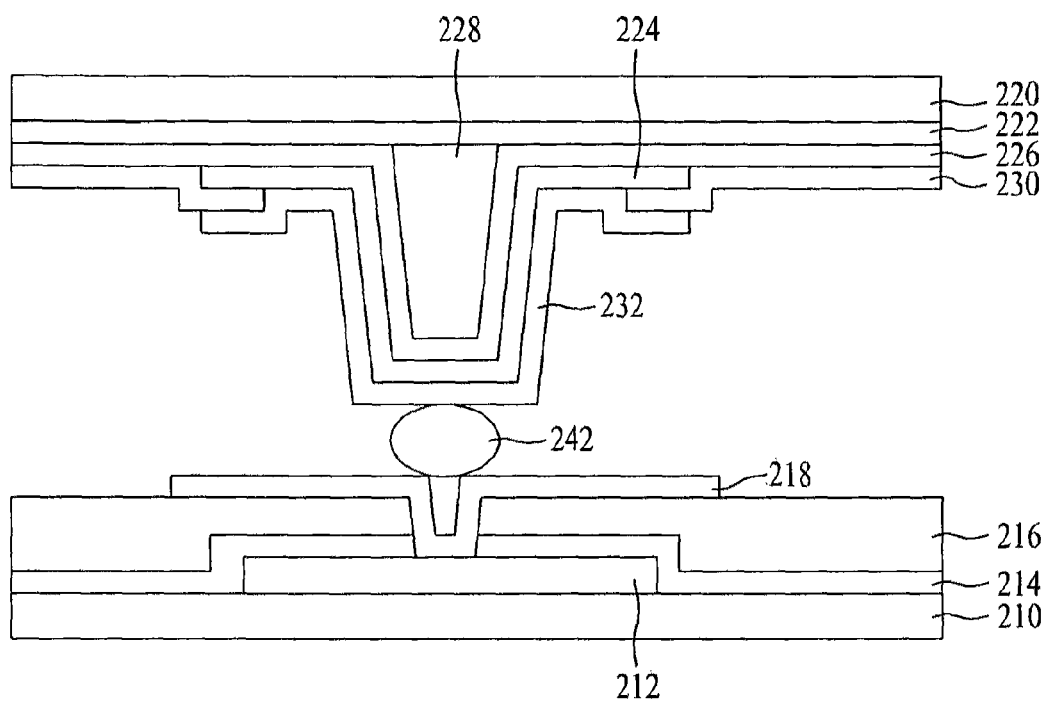
FIG. 4 is a sectional view illustrating a pad of the liquid crystal display according to a second embodiment of the present invention.

FIG. 4 is a sectional view illustrating a pad of the liquid crystal display according to a second embodiment of the present invention.

The pad of the liquid crystal display according to the second embodiment of the present invention, as shown in FIG. 4, includes an IC substrate 220 and a lower substrate 210 opposite each other, a first insulating layer 222 formed throughout an upper surface of the IC substrate 220, a bump 228 formed on the first insulating layer 222, a second insulating layer 226 formed throughout an upper surface of the first insulating layer 222 including the bump 228, an IC pad metal 224 formed on the second insulating layer 226 above the bump 228, a third insulating layer 230 formed on the second insulating layer 226 to expose a predetermined upper region of the IC pad metal 224, a first transparent electrode 232 electrically connected with the IC pad metal 224, a gate pad metal 212 formed on the lower substrate 210, a gate insulating layer 214 formed throughout an upper surface of the lower substrate 210 including the gate pad metal 212, a protective layer 216 formed throughout an upper surface of the gate insulating layer 214, a second transparent electrode 218 electrically connected with the gate pad metal 212 by penetrating through the gate insulating layer 214 and the protective layer 216, and a conductive ball 242 to electrically connect the first transparent electrode 232 and the second transparent electrode 218 to each other.

Detailed descriptions of the IC substrate 220, the lower substrate 210, the IC pad metal 224, the gate pad metal 212, the bump 228, the first transparent electrode 232, and the second transparent electrode 218 are identical to those of the previously described first embodiment, and thus, will be omitted hereinafter.

As compared to the first embodiment, the second embodiment has a different stacking order, but is similar to the first embodiment, in views that, with the use of the photo-acryl bump 228, thickness adjustment is easy and a good thickness uniformity can be accomplished, and consequently, effective electric connection between the lower substrate 210 and the IC substrate 220 can be accomplished.

Next, a method for manufacturing the pad of the liquid crystal display according to the second embodiment of the present invention will be described with reference to the accompanying drawings.

FIGS. 5A to 5F are sectional views illustrating sequential processes of a method for manufacturing the pad of the liquid crystal display according to the second embodiment of the present invention.

Figure 5A:
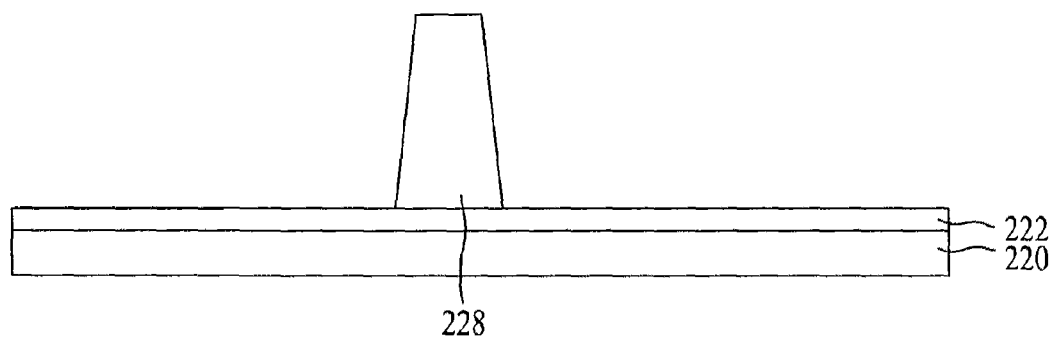
FIGS. 5A to 5F are sectional views illustrating sequential processes of a method for manufacturing the pad of the liquid crystal display according to the second embodiment of the present invention.

As shown in FIG. 5A, any one of inorganic insulating materials, such as silicon nitride (SiN$_x$), silicon oxide (SiO$_2$), etc., is deposited throughout the upper surface of the IC substrate 220, to form the first insulating layer 222.

Subsequently, after a photo-acryl layer is formed on the first insulating layer 222 to have a height of 3 μm or more, the formed photo-acryl layer is patterned via exposure and developing processes, to form the bump 228 on the insulating layer 222.

Figure 5B:
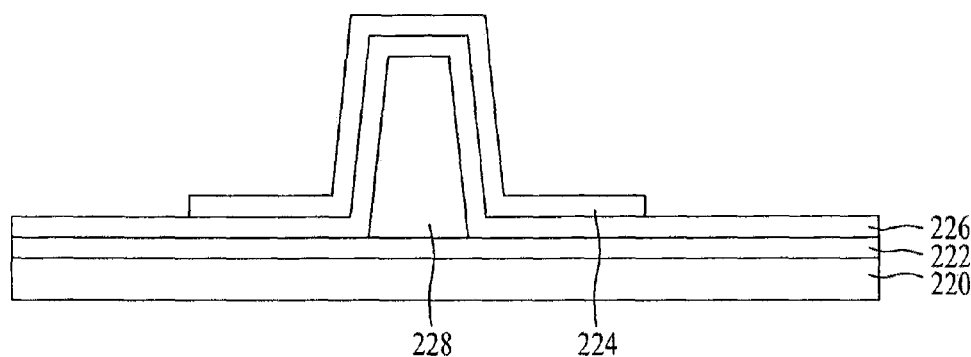

As shown in FIG. 5B, any one of inorganic insulating materials, such as silicon nitride (SiN$_x$), silicon oxide (SiO$_2$), etc., is deposited throughout the upper surface of the first insulating layer 222 including the bump 228, to form the second insulating layer 226.

Subsequently, after depositing any one of low-resistance materials, such as copper (Cu), molybdenum (Mo), chrome (Cr), aluminum (Al), aluminum-neodymium (AlNd), aluminum-molybdenum (AlMo), etc., on the second insulating layer 226, the deposited low-resistance material is patterned via photography and etching processes, to form the IC pad metal 224 on the second insulating layer 226 above the bump 228.

Figure 5C:
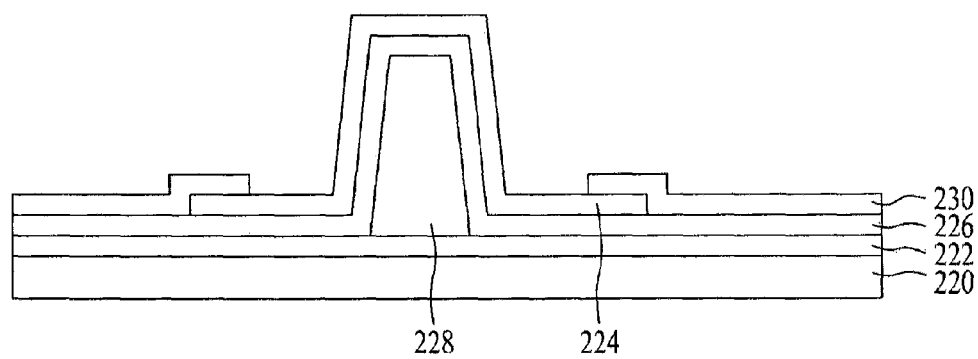

As shown in FIG. 5C, any one of inorganic insulating materials, such as silicon nitride (SiN$_x$), silicon oxide (SiO$_2$), etc., is deposited on the second insulating layer 226 including the IC pad metal 224, to form the third insulating layer 230.

Subsequently, the third insulating layer 230 is patterned via photography and etching processes, to expose the upper region of the IC pad metal 224 to the outside.

Figure 5D:
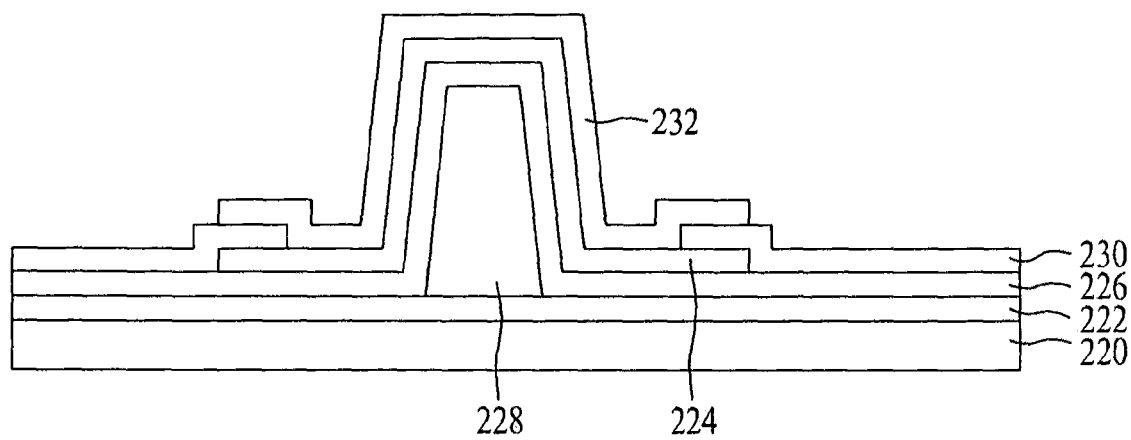

As shown in FIG. 5D, after depositing any one of transparent electrode materials, such as Indium Tin Oxide (ITO) Indium Zinc Oxide (IZO), etc., throughout the upper surface of the third insulating layer 230 including the IC pad metal 224, the deposited transparent electrode material is patterned via photography and etching processes, to form the first transparent electrode 232 electrically connected with the IC pad metal 224.

Figure 5E:
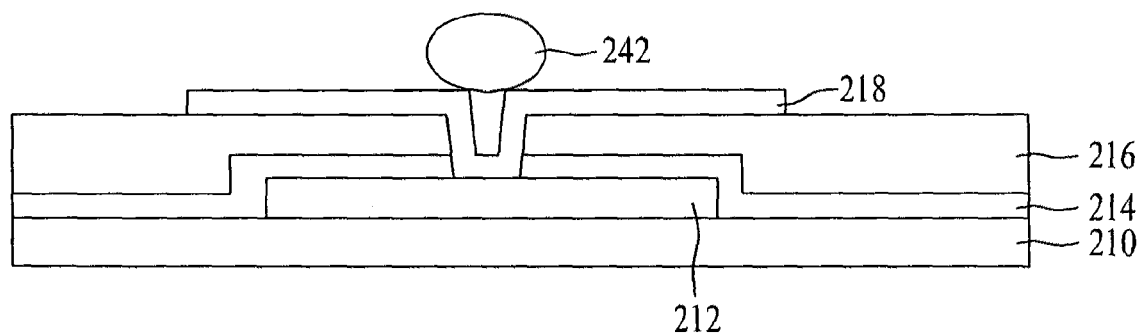

As shown in FIG. 5E, the gate pad metal 212 is formed on the lower substrate 210 by use of any one of low-resistance materials, such as copper (Cu), molybdenum (Mo), chrome (Cr), aluminum (Al), aluminum-neodymium (AlNd), and aluminum-molybdenum (AlMo), and the gate insulating layer 214 and the protective layer 216 are sequentially formed throughout the surface of the lower substrate 210 including the gate pad metal 212.

Subsequently, the gate insulating layer 214 and the protective layer 216 are patterned, to expose a predetermined upper region of the gate pad metal 212. Then, the second transparent electrode 218 is formed, so as to be electrically connected with the gate pad metal 212 by penetrating through the gate insulating layer 214 and the protective layer 216.

Then, thermosetting resin including the conductive ball 242 is formed on the lower substrate 210. In this case, the conductive ball 242 is formed by plating nickel (Ni) on the exterior of a spherical plastic material and again plating gold (Au) thereon.

Figure 5F:
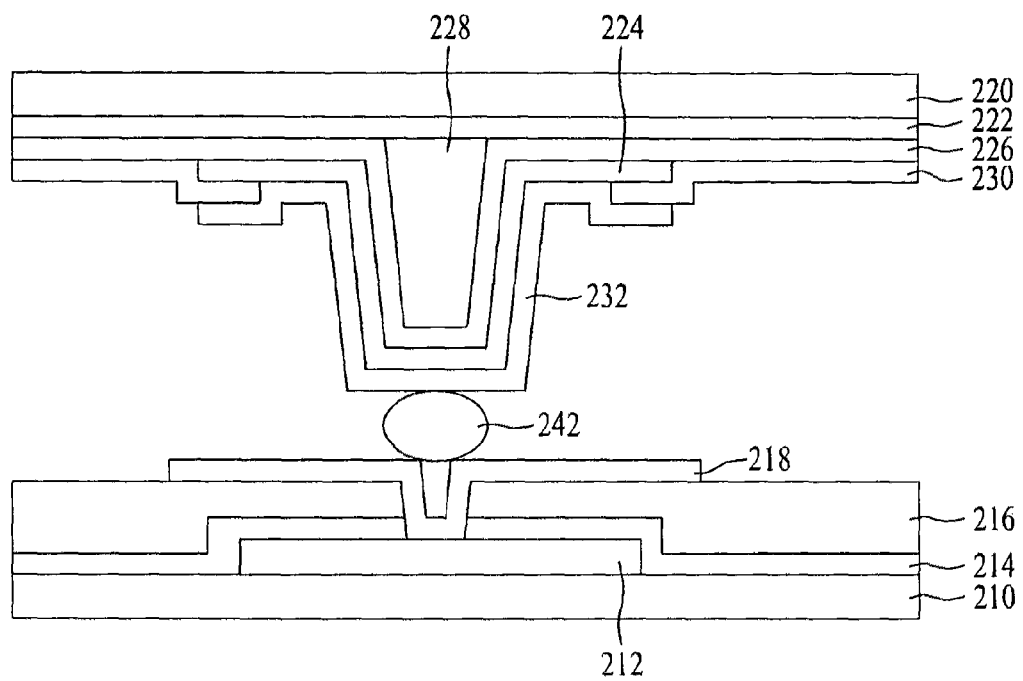

As shown in FIG. 5F, the IC substrate 220 is arranged opposite the lower substrate 210. As both the substrates 220 and 210 are bonded to each other upon receiving external heat, the conductive ball 242 is pressed by both the substrates 220 and 210, and can serve to electrically connect the first transparent electrode 232 and the second transparent electrode 218 to each other between the lower substrate 210 and the IC substrate 220.

Of course, the formation of the first insulating layer 222, the second insulating layer 226 and the third insulating layer 230 on the IC substrate 220 and the formation of the gate insulating layer 214 and the protective layer 216 on the lower substrate 210 may be carried out differently from the above description of the second embodiment, according to process design.

As one example, the first insulating layer 222 may be omitted, any one of the second insulating layer 226 and the third insulating layer 230 may be omitted, or additional insulating layers can be formed. That is, a single insulating layer or a plurality of insulating layers can be formed between the IC pad metal 224 and the first transparent electrode 232.

As another example, the gate insulating layer 214 or the protective layer 216 may be omitted. That is, a single insulating layer or a plurality of insulating layers can be between the gate pad metal 212 and the second transparent electrode 218.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

As apparent from the above description, the pad of the liquid crystal display and the method for manufacturing the same according to the present invention have the following effects.

Firstly, when a driver IC, which is manufactured by a low-temperature poly-silicon driver integrated circuit, is attached to a liquid crystal panel, photo-acryl bumps are formed on an IC substrate via a photography process, thereby achieving good pad uniformity.

Secondly, as a result of forming the photo-acryl bumps on the IC substrate via the photography process, it is possible to manage a desired thickness of the bumps, and consequently, to optionally adjust a thickness of the resulting driver IC. This has the effect of controlling pressure conditions, etc. upon bonding of the IC substrate and the liquid crystal panel.

Thirdly, the IC substrate and the liquid crystal panel can be bonded to each other with enhanced adhesiveness.

What is claimed is:

1. A pad of a liquid crystal display comprising:
   a lower substrate and an upper substrate opposite each other;
   a low-temperature poly-silicon IC substrate opposite to the lower substrate, wherein the IC substrate is on a border of the lower substrate so as not to overlap the upper substrate;
   an IC pad metal formed on the IC substrate;
   a bump formed on the IC substrate to come into contact with the IC pad metal, wherein the bump is made of photo-acryl;
   a first transparent electrode electrically connected with the IC pad metal;
   an interlayer insulating layer formed between the IC pad metal and the first transparent electrode;
   a gate pad metal formed on the lower substrate;
   a second transparent electrode electrically connected with the gate pad metal;
   a gate insulating layer formed between the gate pad metal and the second transparent electrode; and
   a conductive ball to electrically connect the first transparent electrode and the second transparent electrode to each other.

2. The pad according to claim 1, wherein the bump is formed on an upper surface of a predetermined region of the IC pad metal.

3. The pad according to claim 1, wherein the bump is formed on a lower surface a predetermined region of the IC pad metal, and the IC pad metal is formed on the IC substrate along an upper surface of the bump.

4. The pad according to claim 1, wherein the bump has a height of 3 μm or more.

5. A method for manufacturing a pad of a liquid crystal display, comprising:
   forming an IC pad metal on a low-temperature poly-silicon IC substrate;
   forming a bump on the IC substrate to come into contact with the IC pad metal, wherein the bump is made of photo-acryl;
   forming a first transparent electrode electrically connected with the IC pad metal;
   forming a gate pad metal on a lower substrate;
   forming a second transparent electrode on the gate pad metal so as to be electrically connected with the gate pad metal;
   locating an upper substrate opposite to the lower substrate; and
   locating a conductive ball between the IC substrate and the lower substrate, and
   bonding the IC substrate and the lower substrate to each other so as to electrically connect the first transparent electrode and the second transparent electrode to each other via the conductive ball,
   wherein the IC substrate is opposite to the lower substrate and the IC substrate is on a border of the lower substrate so as not to overlap the upper substrate.

6. The method according to claim 5, wherein the step of forming the bump is carried out on a predetermined region of the IC pad metal.

7. The method according to claim 5, wherein the step of forming IC pad metal is carried out on the IC substrate along an upper surface of the bump.

8. The method according to claim 5, further comprising:
   prior to the step of forming the first transparent electrode, forming an interlayer insulating layer on the IC pad metal.

9. The method according to claim 5, further comprising:
   prior to the step of forming the second transparent electrode, forming a gate insulating layer on the gate pad metal.

10. The method according to claim 5, wherein the step of forming of the bump comprising:
    forming a photo-acryl layer; and
    patterning the photo-acryl layer via exposure and developing processes.

11. The method according to claim 5, wherein the bump is formed to have a height of 3 μm or more.

* * * * *